United States Patent
Du

(10) Patent No.: US 12,008,393 B2
(45) Date of Patent: Jun. 11, 2024

(54) METHOD FOR REMOTELY ACCESSING DATA OF A USB DEVICE BY A VIRTUAL MACHINE

(71) Applicant: HUAWEI TECHNOLOGIES CO., LTD., Guangdong (CN)

(72) Inventor: Jinxin Du, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 218 days.

(21) Appl. No.: 17/524,715

(22) Filed: Nov. 11, 2021

(65) Prior Publication Data

US 2022/0066812 A1 Mar. 3, 2022

Related U.S. Application Data

(63) Continuation of application No. PCT/CN2020/089502, filed on May 10, 2020.

(30) Foreign Application Priority Data

May 14, 2019 (CN) .......................... 201910398086.0
May 31, 2019 (CN) .......................... 201910472752.0

(51) Int. Cl.
*G06F 9/455* (2018.01)
*G06F 13/38* (2006.01)

(52) U.S. Cl.
CPC ........ *G06F 9/45558* (2013.01); *G06F 13/382* (2013.01); *G06F 2009/45579* (2013.01); *G06F 2009/45595* (2013.01)

(58) Field of Classification Search
CPC ............... G06F 9/45558; G06F 13/382; G06F 2009/45579; G06F 2009/45595
See application file for complete search history.

(56) References Cited

U.S. PATENT DOCUMENTS 8,224,885 B1 * 7/2012 Doucette ................... G06F 9/00
709/201
8,861,875 B1 * 10/2014 Doucette .............. H04N 19/136
382/233

(Continued)

FOREIGN PATENT DOCUMENTS

CN 104301687 A 1/2015
CN 105100157 A 11/2015

(Continued)

OTHER PUBLICATIONS

Organizing Committee of the Embedded System Invitational Competition for College Students, "Selection of Excellent Works in the Embedded System Special Invitational Competition for Undergraduates", 2004, with an English abstract, total 6 pages.

(Continued)

*Primary Examiner* — Azizul Choudhury
(74) *Attorney, Agent, or Firm* — HUAWEI TECHNOLOGIES CO., LTD.

(57) ABSTRACT

In an image processing method, a server obtains an image sent by a terminal over a network connection. The server splits the image into a plurality of subimages, and converts the subimages into corresponding USB request blocks (URBs). The USB request blocks are received by a USB device driver of the server. The USB device driver splices the URBs back into the image. A USB application program of the server then obtains the image from the USB device driver.

18 Claims, 10 Drawing Sheets

(56) References Cited

U.S. PATENT DOCUMENTS

| | | | |
|---|---|---|---|
| 8,893,013 B1* | 11/2014 | Groves | G06F 3/1454 |
| | | | 715/740 |
| 2013/0246663 A1* | 9/2013 | Raveendran | G06F 13/4022 |
| | | | 710/8 |
| 2013/0254263 A1 | 9/2013 | Kwon et al. | |
| 2014/0317418 A1 | 10/2014 | Lin et al. | |
| 2015/0220467 A1 | 8/2015 | Jin et al. | |
| 2015/0242357 A1 | 8/2015 | Pancholi et al. | |

FOREIGN PATENT DOCUMENTS

| | | | |
|---|---|---|---|
| CN | 106161541 A | 11/2016 | |
| JP | 2002082861 A | 3/2002 | |
| JP | 2004125500 A | 4/2004 | |
| JP | 2008142150 A | 6/2008 | |
| JP | 2008193217 A | 8/2008 | |
| JP | 2008210115 A | 9/2008 | |
| JP | 2020521255 A | 7/2020 | |
| WO | 2011086952 A1 | 7/2011 | |
| WO | 2019011133 A1 | 1/2019 | |

OTHER PUBLICATIONS

Eunjung Kwon et al: "A novel device sharing scheme for thin client", Computing and Convergence Technology (ICCCT),2012 7th International Conference On, IEEE, Dec. 3, 2012 (Dec. 3, 2012), pp. 481-484, XP032422074, total 4 pages.

Anonymous: "USB in a Nutshell—Chapter 4—Endpoint Types", Sep. 26, 2010 (Sep. 26, 2010), pp. 1-8, XP055917613, total 8 pages.

Takahiro Hirofuchi, "USB/IP—a Peripheral Bus Extension for Device Sharing over IP Network", FREENIX Track: 2005 USENIX Annual Technical Conference, XP007901448, total 14 pages.

ITU-T H.264,Series H: Audiovisual and Multimedia Systems; Infrastructure of audiovisual services Coding of moving video,Advanced video coding for generic audiovisual services,(Apr. 2017),total 812 pages.

\* cited by examiner

METHOD FOR REMOTELY ACCESSING DATA OF A USB DEVICE BY A VIRTUAL MACHINE

CROSS-REFERENCE TO RELATED APPLICATIONS

This application is a continuation of International Application No. PCT/CN2020/089502, filed on May 10, 2020, which claims priority to Chinese Patent Application No. 201910472752.0, filed on May 31, 2019, and Chinese Patent Application No. 201910398086.0, filed on May 14, 2019. All of the aforementioned patent applications are hereby incorporated by reference in their entirety.

TECHNICAL FIELD

This application relates to the field of information technologies, and in particular, to a method for remotely accessing data of a USB device by a virtual machine.

BACKGROUND

In a cloud desktop scenario, a universal serial bus (USB) redirection technology is used, so that a virtual machine can use a USB device on a cloud terminal over a network connection. In this way, a user can use the virtual machine, such as a high-speed document scanner, a camera, or a scanner connected to the cloud terminal, to make office work easier. However, when an image device connected to the cloud terminal is used by means of the USB redirection technology, if an image generated by the image device is a high-resolution image, there are disadvantages of a long delay and high bandwidth usage in image transmission between the virtual machine and the cloud terminal.

SUMMARY

The present invention provides a method for remotely accessing data of a USB device by a virtual machine. Image data transmitted by a USB device is spliced into one image and then the image is transmitted to a virtual machine, to reduce a data transmission delay.

A first aspect of the embodiments of the present invention provides a data processing method performed by a terminal. The terminal is connected to a USB device, and accesses a virtual machine in a server through a network. After collecting image data, the USB device sends the collected image data to the terminal. Because of a limitation of a USB request block (URB) in the USB communication protocol, the USB device needs to segment one image into a plurality of pieces of image data, and then separately sends the plurality of pieces of image data obtained through the segmentation to the terminal. After receiving the plurality of pieces of image data sent by the USB device, the terminal splices the plurality of pieces of image data into the image, and then sends the image to the server in which the virtual machine is located.

The plurality of pieces of image data are spliced into the image and then the image is sent to the server, to reduce a network delay caused when the plurality of pieces of image data are separately transmitted to the server through the network.

In an optional implementation of the first aspect, before receiving the plurality of pieces of image data sent by the USB device, the terminal further generates a plurality of data request packets, where the plurality of data request packets are URBs defined in the URB protocol, and then sends the plurality of request packets to the USB device. After receiving the plurality of data request packets, the USB device generates a response message for each data request packet, and then sends the response message to the terminal, where each response message carries one piece of image data.

The terminal simulates the data request packet generated in the server, so that an amount of data transmitted on the network can be reduced, thereby saving network bandwidth.

In an optional implementation of the first aspect, before the image is sent to the server in which the virtual machine is located, the method further includes: compressing the image.

The to-be-transmitted image is compressed, so that an amount of data transmitted on the network can be further reduced, thereby further saving network bandwidth.

In an optional implementation of the first aspect, the terminal determines that a format of the image is not a compression format.

In an optional implementation of the first aspect, the terminal receives a format that is of image data and that is sent by the server, where the format of the image data is used to determine whether the format of the image is a compression format.

The format of the image data is obtained from a serving end, so that the present invention can be implemented without performing excessive modifications on the terminal by a user.

Before the plurality of data request packets are generated, the method further includes:

receiving a generation instruction sent by the server, where the generation instruction is used to instruct the terminal to generate the plurality of data request packets.

In an optional implementation of the first aspect, the generation instruction includes an access address of the USB device.

Generating the plurality of data request packets includes: adding the access address of the USB device to each data request packet. The method further includes: searching for the USB device based on the access address of the USB device in each data request packet.

In an optional implementation of the first aspect, each response message further includes a frame identifier and a subframe identifier, the frame identifier is used to identify the image, and the subframe identifier is used to identify a location at which the image data carried in the response message is located in the image. Splicing the plurality of pieces of image data into the image includes: splicing, based on the frame identifier and the subframe identifier, the image data carried in the plurality of response messages into the image.

The frame identifier and the subframe identifier are set, so that the plurality of pieces of image data can be quickly and accurately spliced into the image.

In an optional implementation of the first aspect, the method further includes: receiving resolution sent by the server; determining, based on the resolution, a size of a buffer for buffering the image; and buffering the image after splicing the plurality of pieces of image data into the image.

In an optional implementation of the first aspect, the method further includes: receiving resolution sent by the server; and after splicing the plurality of pieces of image data into the image, determining, based on the resolution, whether an error occurs in the spliced image.

In an optional implementation of the first aspect, the method further includes: when an operating system used by the terminal is different from an operating system used by the virtual machine, converting the request packet into a format that can be identified by the terminal.

A second aspect of the embodiments of the present invention provides a data processing method performed by a server. A virtual machine is run on the server, and the server communicates with a terminal through a network. A USB device driver in the server first generates a plurality of data request packets. A serving end receives an image frame sent by the terminal, segments the image frame into a plurality of subframes, and generates response message for each data request packet, where each piece of response message includes one subframe in the plurality of subframes. The USB device driver obtains the subframe in each piece of response message to splice the plurality of subframes into the image frame.

In an optional implementation of the second aspect of the present invention, the serving end sends a start instruction for a USB device to the terminal; receives response message sent by the terminal in response to the start instruction; and when the response message indicates that the USB device is started, sends a generation instruction to the terminal, where the generation instruction is used to instruct the terminal to generate the plurality of data request packets.

A third aspect of the embodiments of the present invention provides a terminal. The terminal is connected to a universal serial bus USB device, the terminal accesses a virtual machine through a network, the virtual machine is run on a server, the terminal includes a USB bus driver and a USB client, and the USB bus driver and the USB client are configured to perform the steps of the data processing method provided in the implementations of the first aspect.

A fourth aspect of the embodiments of the present invention provides a server. The server communicates with a terminal through a network, the server includes a USB device driver and a serving end, and the USB device driver and the serving end are configured to perform the steps of the data processing method provided in the implementations of the second aspect.

A fifth aspect of the embodiments of the present invention provides a terminal. The terminal includes a processor and a memory, the memory stores a program instruction, and the processor executes the program instruction in the memory to perform the steps of the data processing method provided in the implementations of the first aspect.

A sixth aspect of the embodiments of the present invention provides a server. The server includes a processor and a memory, the memory stores a program instruction, and the processor executes the program instruction in the memory to perform the steps of the data processing method provided in the implementations of the second aspect.

A seventh aspect of the present invention provides a computer readable storage medium. The storage medium stores a program instruction, and the steps of the data processing method provided in the first aspect of the present invention can be implemented by executing the program instruction.

An eighth aspect of the present invention provides a computer readable storage medium. The storage medium stores a program instruction, and the steps of the data processing method provided in the second aspect of the present invention can be implemented by executing the program instruction.

A ninth aspect of the present invention provides a data processing system, including the virtual machine provided in the implementations of the second aspect of the embodiments of the present invention and the terminal provided in the implementations of the first aspect of the embodiments of the present invention.

BRIEF DESCRIPTION OF DRAWINGS

To describe technical solutions in embodiments of the present invention or in the prior art more clearly, the following briefly describes accompanying drawings for describing the embodiments or the prior art.

DESCRIPTION OF EMBODIMENTS

The following clearly and completely describes technical solutions in the embodiments of the present invention with reference to the accompanying drawings in the embodiments of the present invention. It is clear that the described embodiments are merely some but not all of the embodiments of the present invention.

With development of network technologies, cloud desktops are used by many enterprises because the cloud desktops have features such as convenience in use, easy management, and scalability. During use of the cloud desktop, a USB device on a terminal may be used by using a USB redirection technology.

Figure 1:
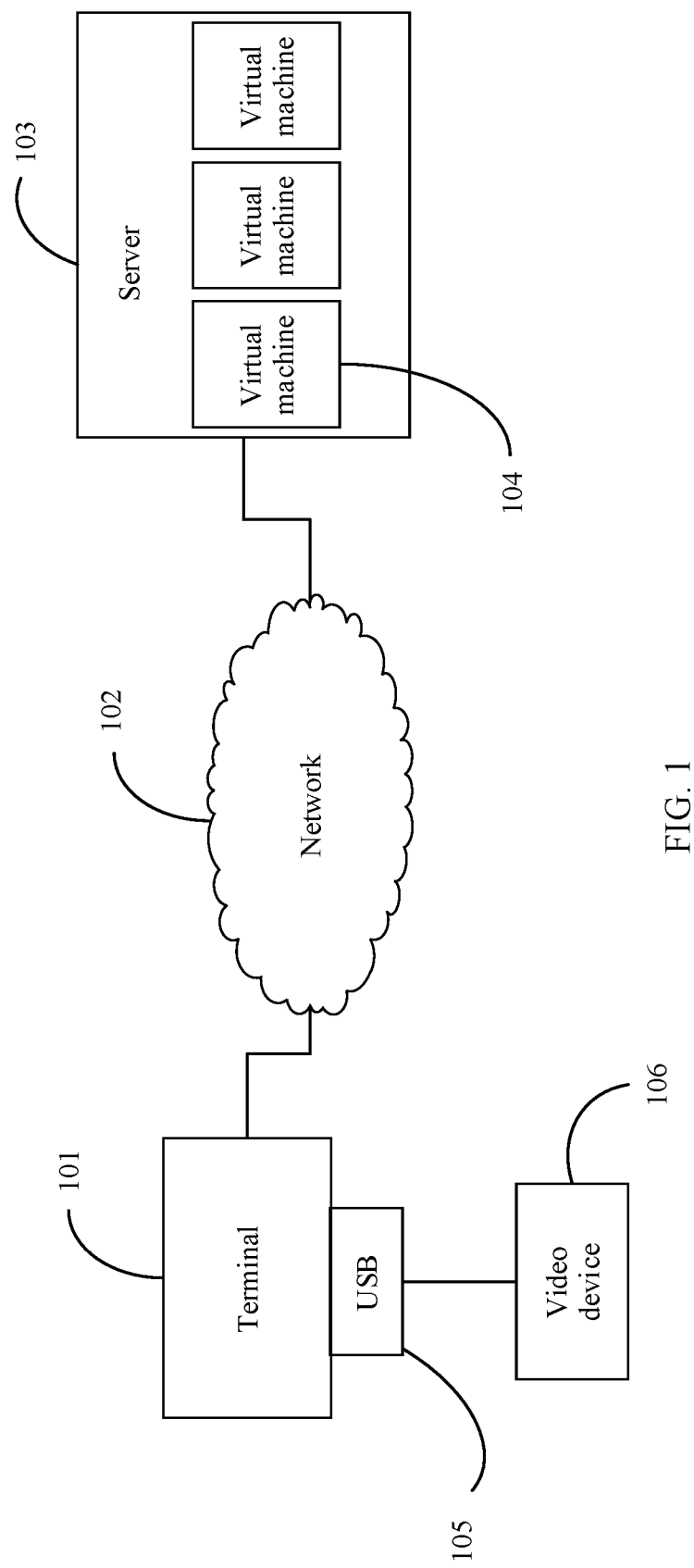
FIG. 1 is an architectural diagram of a cloud desktop system to which an embodiment of the present invention is applied.

FIG. 1 is an architectural diagram of a cloud desktop system. A terminal 101 is connected to a remote server 103 through a network 102. At least one virtual machine 104 is run on the server 103. The terminal 101 may access the virtual machine 104 through the network 102, and the network is the internet or a local area network.

The terminal 101 may be a notebook computer, a mobile phone, a desktop computer, a thin client, or the like. The terminal 101 includes peripherals such as a display, a keyboard, a mouse, and a video device. A user accesses the virtual machine 104 based on the peripherals provided by the terminal 101, for example, displays a cloud desktop by using the display, operates the cloud desktop by using the keyboard and the mouse, and obtains image data by using the video device and displays the image data on the cloud desktop. Several USB ports 105 are usually disposed on the terminal 101, and some USB devices 106 such as a mouse, a keyboard, and a video device are connected to the terminal 101 through the USB ports 105. The virtual machine 104 uses, by using a USB redirection technology, the USB device 106 connected to the USB port 105.

Figure 2:
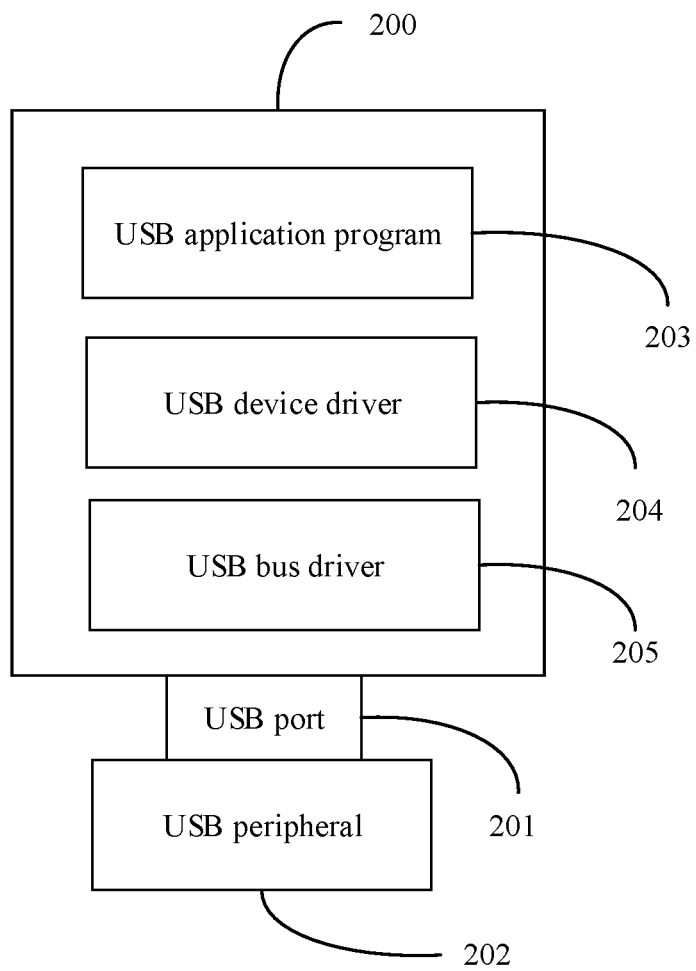
FIG. 2 shows a direction in which data flows between function modules of a terminal when the terminal accesses a USB device connected to the terminal according to an embodiment of the present invention.

For better understanding of the USB redirection technology, a method in which a terminal (for example, a personal computer) accesses a USB device connected to the terminal is first described. As shown in FIG. 2, a terminal 200 is connected to a USB device 202 through a USB port 201, and the terminal 200 includes a USB application program 203, a USB device driver 204, and a USB bus driver 205. The USB application program 203 is an application program that needs to access a USB device, and may be, for example, video software such as a camera, online live telecasting software, or video chat software. The USB device driver 204 and the USB bus driver 205 are drivers disposed to enable the USB application program to access the USB device, and are installed in the terminal 200 and are run by a processor of the terminal 200. For ease of description, in the following descriptions, a function performed by the processor by running a program is described as a function performed by the program.

When the USB device 202 is connected to the terminal 200, the USB port 201 generates a connection signal. After detecting the connection signal, the USB bus driver 205 starts the USB device driver 204, to prepare for transmitting data between the USB application program and the USB device 202.

FIG. 2 describes a process in which the terminal 200 accesses the USB device connected to the terminal 200. In this scenario, the USB application program, the USB device driver, and the USB bus driver are all in the terminal. However, in a cloud desktop system, that is, in a scenario in which a virtual machine accesses a USB device connected to a terminal, because data needs to be transmitted over a network through which two devices are connected, a USB application program and a USB device driver are installed at the virtual machine end, and a USB bus driver is installed in the terminal. For a structural diagram of the virtual machine 104 and the terminal 101 in the cloud desktop system, refer to descriptions in FIG. 3.

Figure 3:
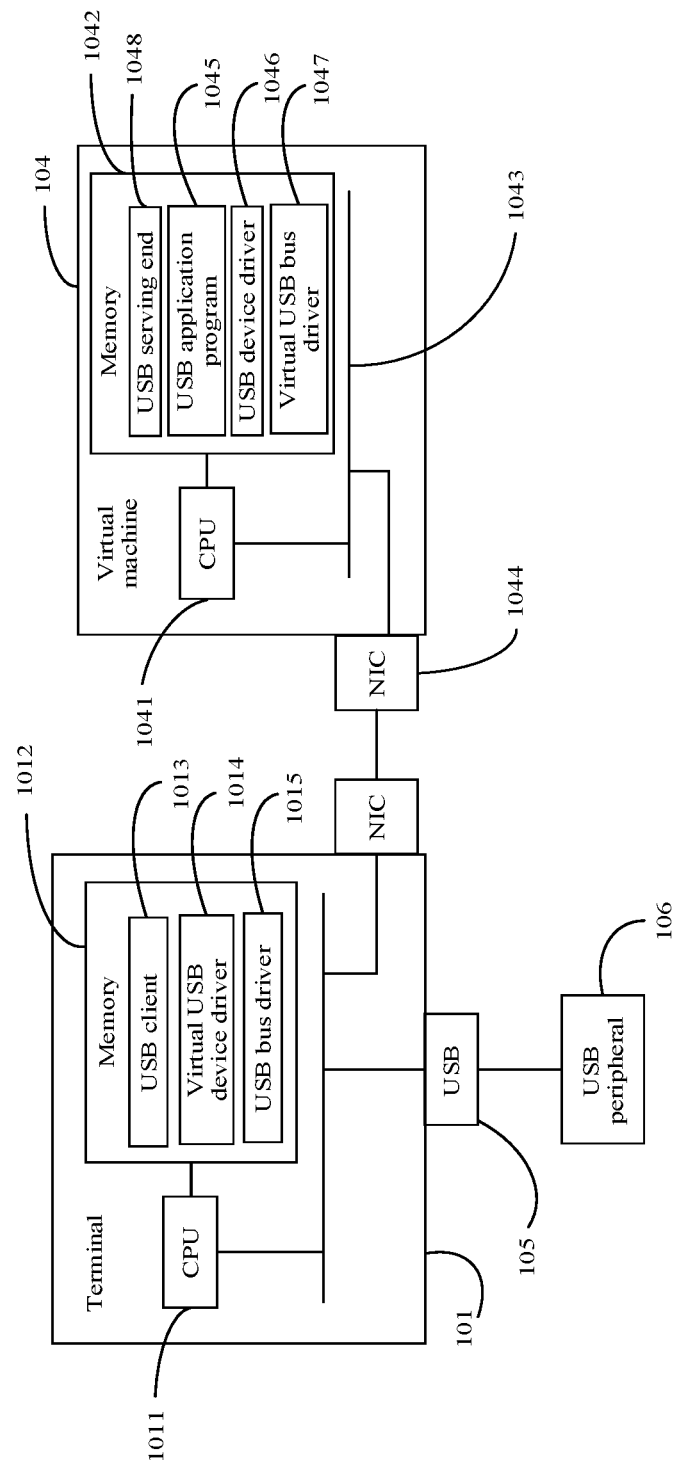
FIG. 3 is a structural diagram of a virtual machine and a terminal according to an embodiment of the present invention.

As shown in FIG. 3, a host machine of the virtual machine 104 is the server 103. Therefore, a CPU 1041, a memory 1042, a bus 1043, and a network interface card (NIC) 1044 of the virtual machine 104 are virtual resources allocated by the server 103 to the virtual machine 104. The memory 1042 stores a USB application program 1045, a USB device driver 1046, a virtual USB bus driver 1047, and a USB serving end 1048. The terminal 101 includes a CPU 1011, a memory 1012, a bus 1013, and a network interface card 1014. The memory 1012 stores a USB client 1013, a virtual USB device driver 1014, and a USB bus driver 1015. The CPU 1041 runs programs stored in the memory 1042 to implement functions of the programs. Similarly, the CPU 1011 runs programs stored in the memory 1012 to implement functions of the programs.

Because the virtual machine 104 is connected to the terminal 101 through a network, the USB application program 1045 is installed in the virtual machine 104, and the USB device 106 is connected to the terminal 101, the USB application program 1045 needs to access the USB device 106 through the network. The USB bus driver 1015 is installed in the terminal 101, and the USB device driver 1046 is installed in the virtual machine 104, so that the USB application program 1045 can access the remote USB device 106 through the network. In addition, the virtual USB bus driver 1047 is installed in the virtual machine 104, and the virtual USB device driver is installed in the terminal 101, so that neither the virtual machine 104 nor the terminal 101 perceives that the other party in communication is at a remote end. In this embodiment of the present invention, the terminal 101 communicates with the virtual machine 104 by using the cloud desktop protocol. Therefore, the USB client 1013 is disposed in the terminal 101, and the USB serving end 1048 is disposed in the virtual machine 104, to convert data to be transmitted between the virtual machine 104 and the terminal 101 into data in a format that conforms to the cloud desktop protocol. In this embodiment, the cloud desktop protocol may be the remote desktop protocol (RDP), the independent computing architecture (ICA) protocol, or the like.

Figure 4:
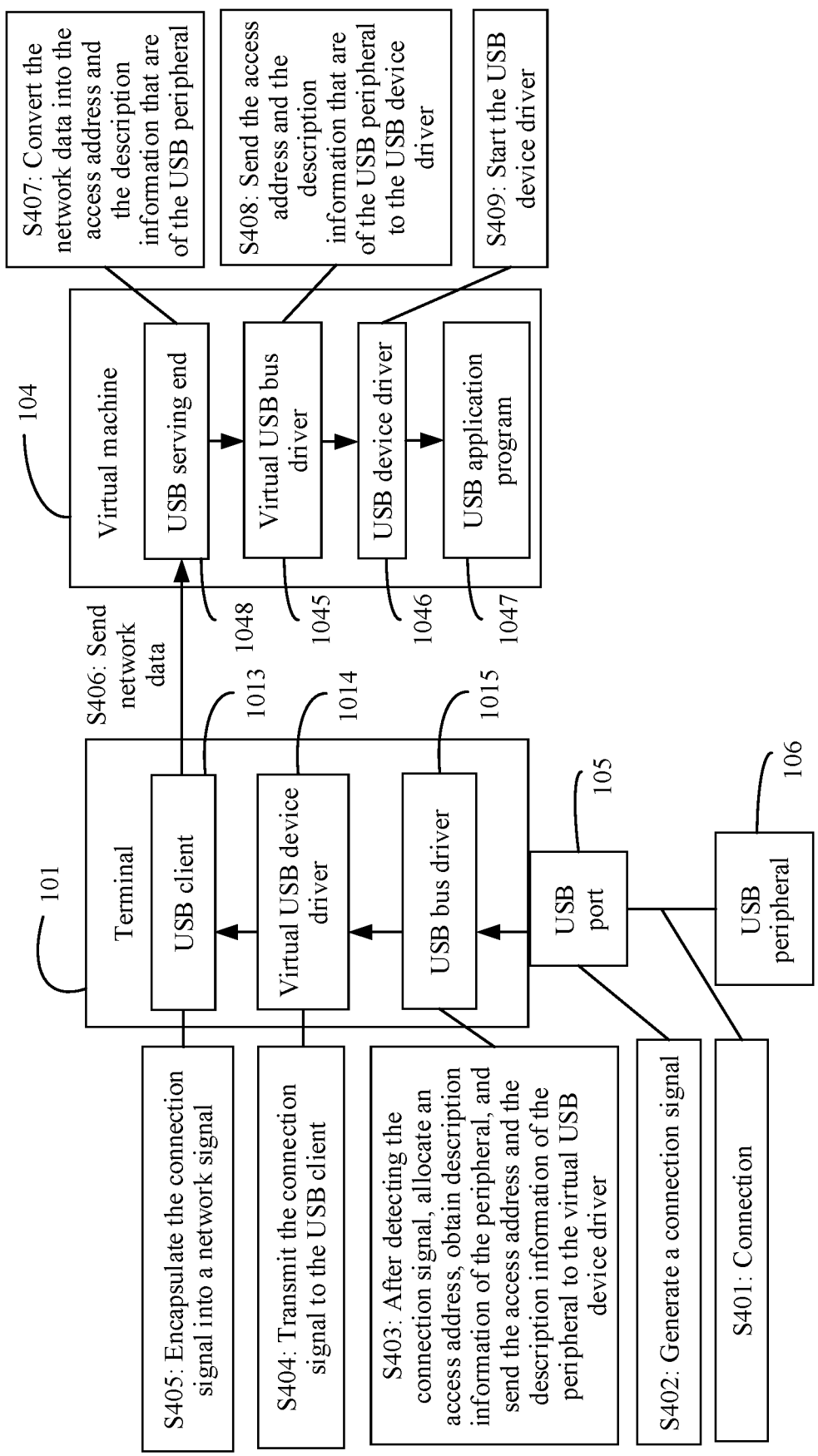
FIG. 4 is a flowchart of a method for obtaining information about USB by the virtual machine after a USB device is connected to the terminal according to an embodiment of the present invention.

The following describes a method in which when the peripheral 106 is connected to the terminal 101, the virtual machine 104 discovers the terminal 101 and starts the USB device driver 1046, so that the USB application program 1045 communicates with the video device 106. A flowchart of the method is shown in FIG. 4.

Step S401: The USB device 106 is connected to the USB port 105 of the terminal 101.

Step S402: The USB port 105 generates a connection signal.

Step S403: After detecting the connection signal, the USB bus driver 1015 searches for a device driver for the USB device 106, allocates an access address to the USB device 106, and obtains description information of the peripheral 106. The description information includes a device descriptor and a configuration descriptor. The device descriptor may be a device type, a supported protocol, or the like. The configuration descriptor may be a function supported by the USB device. Because the USB device driver is installed in the virtual machine 104, the virtual USB device driver 1014 is installed in the terminal, so that the USB bus driver still works in an original manner. In this way, the USB bus driver 1015 may use the virtual USB device driver 1014 as the device driver of the peripheral 106, and sends the access address allocated to the peripheral and the obtained description information to the virtual USB device driver 1014.

Step S404: The virtual USB device driver 1014 sends the access address and the description information that are of the USB device 106 to the USB client 1013.

Step S405: The USB client 1013 encapsulates the received data into network data that conforms to the cloud desktop protocol.

Step S406: The USB client 1013 transmits the network data to the virtual machine 104 through a network.

Step S407: After receiving the network data, the USB serving end 1048 of the virtual machine 104 converts the network data into the access address and the description information that are of the USB device 106, and transmits the converted data to the virtual USB bus driver 1047. The virtual USB bus driver 1047 is disposed at the virtual machine end, so that the USB device driver 1046 does not perceive that the data is transmitted through the network.

It should be noted herein that when the virtual machine 104 and the terminal 101 use different operating systems, the virtual USB bus driver 1047 further converts the connection signal into a signal that can be identified by a system of the virtual machine 104. For example, assuming that the virtual machine 104 uses a Linux system, and the terminal 101 uses a Windows system, the virtual USB bus driver 1047 converts data in the Windows format into data in the Linux format.

Step S408: The virtual USB bus driver 1047 sends the access address and the description information to the USB device driver.

Figure 5:
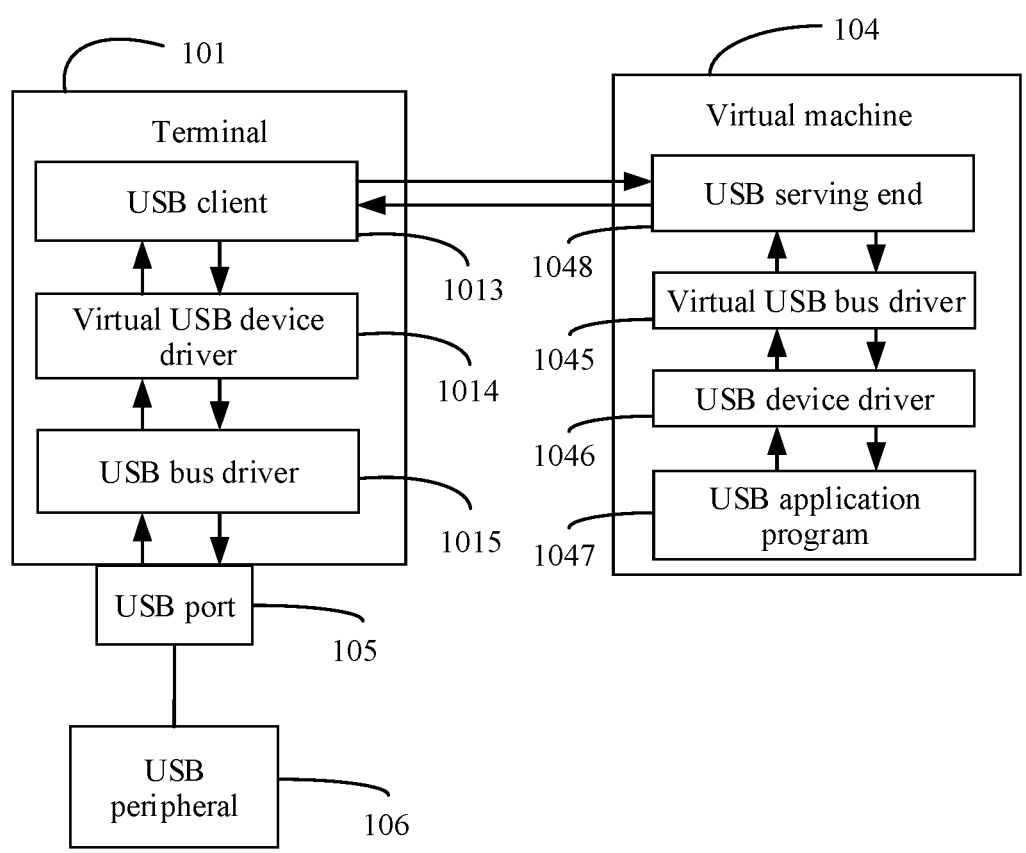
FIG. 5 is a schematic diagram in which data flows between modules when a virtual machine accesses a USB device connected to a terminal according to Embodiment 1 of the present invention.
Figure 6A:
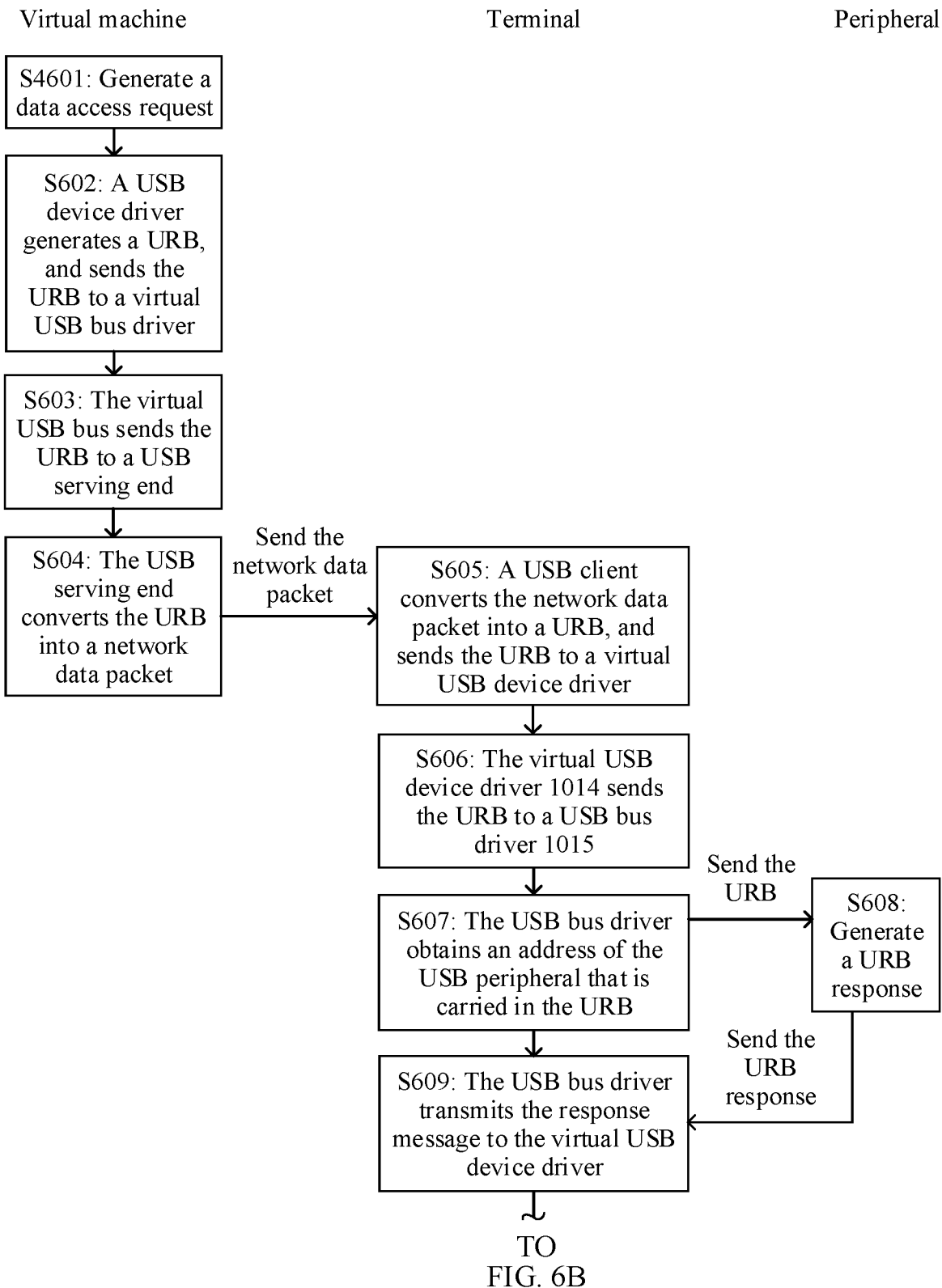
FIG. 6A and FIG. 6B are a flowchart of a method in which a virtual machine accesses a USB device connected to a terminal according to Embodiment 1 of the present invention.
Figure 6B:
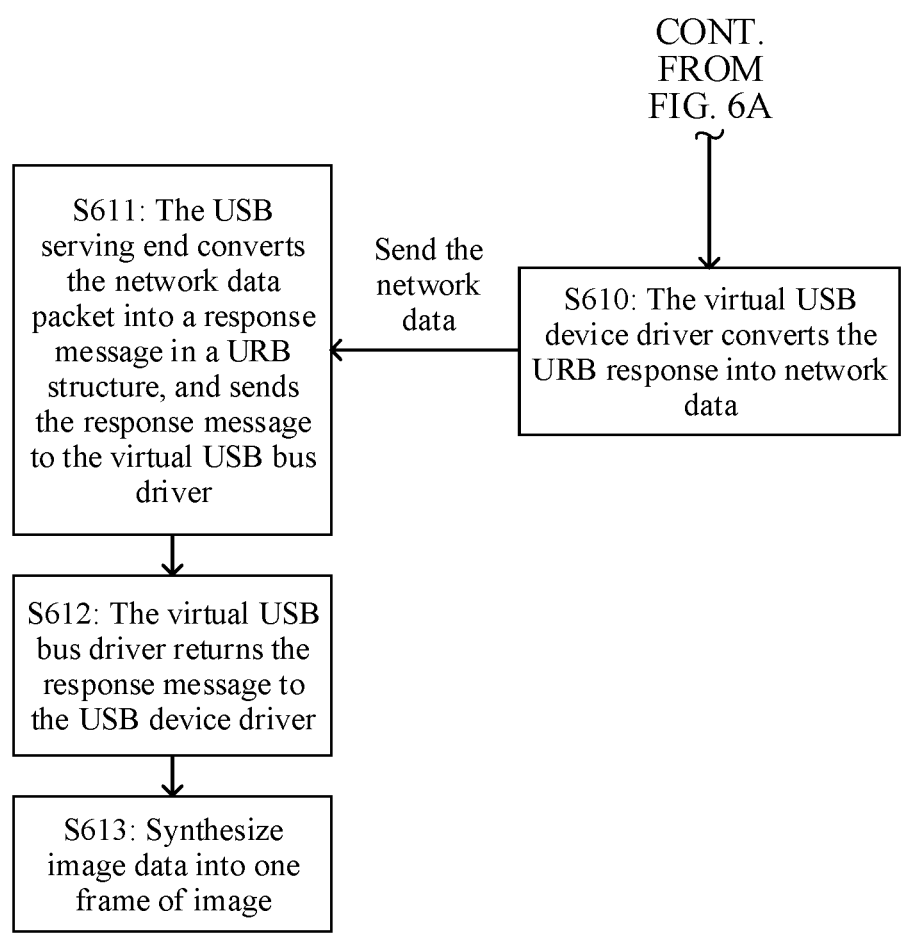

Step S409: After the USB device driver 1046 receives the access address and the description information, the virtual machine 104 records the access address and the description information, and starts the USB device driver. After the USB device driver 1046 is started, the USB application program 1045 may exchange data with the USB device 106. With reference to FIG. 5 and FIG. 6A and FIG. 6B, the following describes a process in which the USB application program 1045 exchanges data with the USB device 106.

The embodiments of the present invention mainly describe a process in which the USB application program 1045 obtains image data of the USB device 106 when the USB application program 1045 is an image application program (for example, a camera, live broadcast software, or chat software used to obtain video data, or a scanner program used to scan an image) and the USB device 106 is an image device that obtains an image. FIG. 5 shows a direction in which data flows when the USB application program 1045 obtains image data of the USB device 106. FIG. 6A and FIG. 6B are a flowchart of a method in which the USB application program 1045 obtains image data of the USB device 106.

The embodiments in FIG. 5 and FIG. 6A and FIG. 6B are described by using an example of obtaining one image of the USB device 106. In the embodiments, when the USB application program 1045 is video software, the USB device driver pre-installed in the virtual machine 104 is a universal USB video class protocol, or certainly may be a protocol dedicated to another video device.

Step S601: The USB application program 1045 generates a data access request, and sends the data access request to the USB device driver, where the data access request includes an address of the USB device 106. When a user needs to obtain image data, the user opens the USB application program 1045 installed in the virtual machine, or enables a video function of the USB application program. In this case, the data access request can be generated.

Step S602: The USB device driver 1046 generates a USB request block (URB) based on the received data access request, and sends the URB to the virtual USB bus driver.

The USB application program 1045 interacts with the USB device 106 mainly by using the URB protocol. The URB is a core data structure used in the USB device driver 1046 to describe communication with the USB device 106. When generating the URB, the USB device driver 1046 defines an amount of data that can be carried in the URB, and the URB further carries the address of the USB device 106. The address of the USB device 106 is allocated by the USB bus driver 1015 when the USB device 106 is connected to the terminal 101. For an obtaining manner, refer to related descriptions in FIG. 4. In addition, the USB device driver 1046 continuously generates the URB, to continuously obtain the image data generated by the USB device 106.

Step S603: The virtual USB bus 1045 sends the URB to the USB serving end 1048.

Step S604: The USB serving end 1048 converts the URB into a network data packet that can conform to the cloud desktop protocol, and then sends the network request packet to the terminal 101.

During conversion, related data is first extracted from the URB, for example, the address or a data length of the USB device 106, and then the extracted data is encapsulated into the network data packet that conforms to the cloud desktop transmission protocol.

Step S605: After receiving the network data packet, the USB client 1013 of the terminal 101 converts the network data packet into a URB, and sends the URB to the virtual USB device driver 1014.

It should be noted herein that when the terminal 101 and the virtual machine 104 use different operating systems, a structure of a URB generated by the terminal 101 is different from that of the URB of the virtual machine 104. In this case, the USB client 1013 further converts the URB into a URB that can be identified by an operating system of the terminal 101. For example, when the virtual machine 104 uses a Linux operating system, and the terminal uses a Windows operating system, the virtual USB device driver 1014 needs to convert the URB generated in the Linux operating system into the URB in the Windows operating system.

Step S606: The virtual USB device driver 1014 sends the URB to the USB bus driver 1015.

Step S607: The USB bus driver 1015 sends the URB to the USB device 106 based on the address of the USB device 106 that is carried in the URB.

Step S608: After receiving the URB, the USB device 106 fills data with a fixed length that is defined in the URB and that is obtained by the USB device 106 in a buffer carried in the URB, and then adds header information to the URB, where the header information includes an identifier of a frame to which the image data belongs and an identifier of the part that belongs to the frame, and therefore the USB device 106 generates a response message for the URB, and transmits the response message to the USB bus driver 1015.

Step S609: The USB bus driver 1015 transmits the response message to the virtual USB device driver 1014.

Step S610: The virtual device driver 1014 converts the response message returned by the virtual USB device driver into network data, namely, a TCP packet, and then sends the network data to the USB serving end 1048 through a network.

Step S611: The USB serving end 1048 converts the network data packet into a response message in a URB structure, and sends the response message to the virtual USB bus driver 1045.

Step S612: The virtual USB bus driver 1045 returns the response message to the USB device driver 1046.

Step S613: The USB device driver 1046 synthesizes image data in a plurality of returned response messages into one image, then returns the synthesized image to a video app, and displays the image. In this way, video data can be obtained from the video device 106.

An identifier of a frame to which each subimage belongs and an identifier of each sub-image are recorded in the request packet in the URB format, and the USB device driver 1046 may splice the image data into one image based on the identifier of the frame and the identifier of the sub-image.

It should be noted herein that after the video application program is opened, the video application program queries, from the USB device driver, camera attributes such as a data format and resolution that are supported by the video device and performs a camera start operation. The USB device driver generates a control instruction for obtaining a parameter and a control instruction for starting a camera. The control instruction is encapsulated into a control instruction in a URB structure and then the control instruction in the URB structure is transmitted to the terminal, to obtain the parameter of the video application program and control the camera to be started. A data flow direction of the control instruction is the same as that in FIG. 5. Details are not described herein again.

Due to a limitation of the URB protocol, each URB request packet can carry only data with a specific length. Usually, one image can be obtained only after a plurality of URB requests are sent, and each URB request needs to be transmitted through the network. Especially in a scenario in which a high-resolution image needs to be obtained, more URB requests need to be transmitted to display one image. Consequently, an accumulated network delay is higher, and therefore the image freezes or cannot be displayed.

In addition, all the response messages obtained from the terminal 101 are sent to the virtual machine 104 through the network without being compressed, thereby resulting in extremely high network bandwidth.

To resolve the foregoing problem, another embodiment of the present invention provides a data processing method. Image data in a plurality of URBs may be spliced into one image, and then the image is sent to the virtual machine, to reduce a network delay.

Further, the spliced image may be compressed, and the compressed image is sent to the virtual machine, so that network bandwidth can be saved.

After the video application program is opened, same as Embodiment 1, in this embodiment, the video application program sends a control instruction to obtain camera attributes such as a data format and resolution that are supported by the video device and perform a camera start operation, and feeds back a result to the video application program. Different from Embodiment 1, in this embodiment, when receiving parameters such as a data format, resolution, and a data transmission channel that are sent by the client, the serving end returns the parameters to the client. Details that the client uses the parameters are described below.

Figure 7:
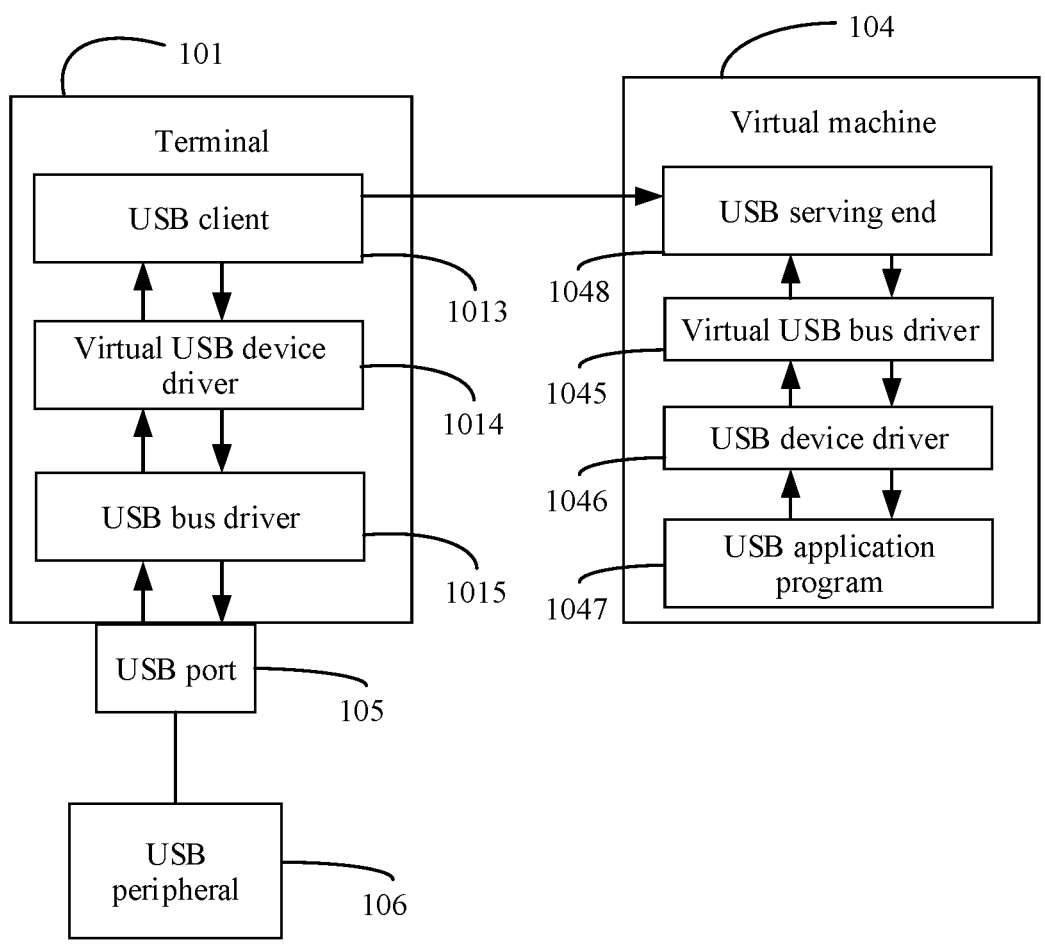
FIG. 7 is a schematic diagram in which data flows between modules when a virtual machine accesses a USB device connected to a terminal according to Embodiment 2 of the present invention.
Figure 8A:
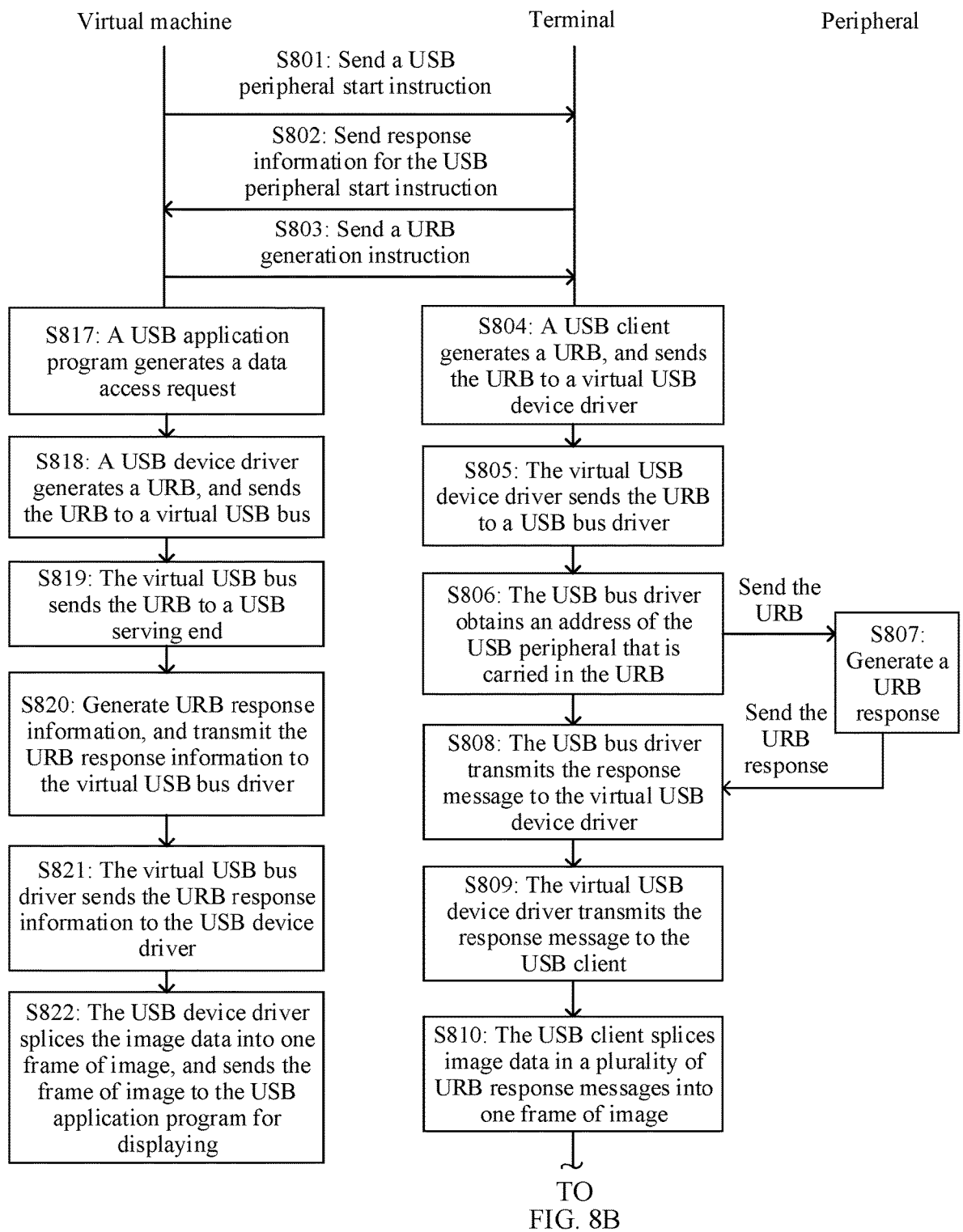
FIG. 8A and FIG. 8B are a flowchart of a method in which a virtual machine accesses a USB device connected to a terminal according to Embodiment 2 of the present invention.
Figure 8B:
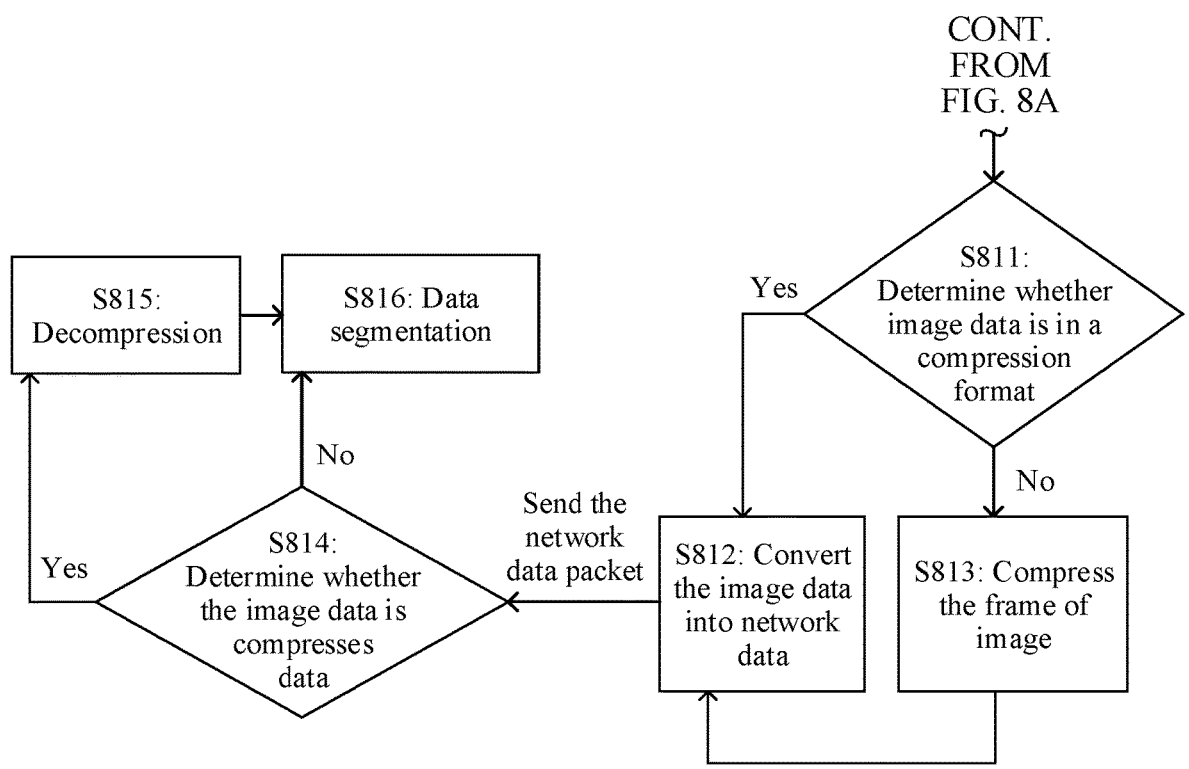

FIG. 7, and FIG. 8A and FIG. 8B are respectively a schematic diagram and a flowchart of a data flow direction in a method for saving network bandwidth for obtaining image data according to an embodiment of the present invention. The method is also applied to the system architectures shown in FIG. 1 and FIG. 3.

Step S801: After the USB application program 1047 is opened, the USB application program 1047 sends a USB device start instruction to the terminal 101.

In this embodiment of the present invention, after the USB application program 1047 is opened, the USB application program 1047 further sends a control instruction to obtain attributes of the USB device 106, such as a data format and resolution that are supported by the USB device. A manner in which the USB application program obtains the attributes of the USB device and starts the device is the same as that in Embodiment 1. Details are not described herein again. Different from Embodiment 1, in this embodiment, in a process in which the USB application program 1047 obtains the parameter of the USB device 106, the USB client 1013 obtains and stores the transmitted parameter. In Embodiment 1, the USB client 1013 only transmits the parameter to the virtual machine 104. However, in this embodiment, the USB client 1013 obtains the transmitted parameter. The parameter is obtained in two manners. In a first manner, when the parameter is transmitted to the USB client 1013, after directly obtaining the transmitted parameter, the client 1013 continues to transmit the parameter to the virtual machine 104. In the other manner, after receiving the parameter, the USB client transmits the parameter to the USB serving end 1048 of the virtual machine, and after obtaining the parameter, the USB serving end 1048 returns the obtained parameter to the USB client 1013. In actual application, when the terminal 101 is inconvenient for compilation, the used parameter may be provided for the USB client 1013 in a manner of obtaining the parameter on the virtual machine side and then returning the parameter to the terminal 101.

Step S802: After receiving the USB device start instruction, the terminal 101 starts the USB device 106, and then transmits response message indicating that the USB device is started to the virtual machine 104.

Step S803: The USB application program of the virtual machine 104 sends a data access request to the USB client 1013.

Step S804: The USB client 1013 generates a URB based on the received data access request, and sends the generated URB to the virtual USB device driver.

When the URB request packet is generated, an address of the USB device 106 is specified in the URB request packet. The address of the USB device 106 may be sent by the USB serving end to the USB client 1013, or may be obtained by the USB client 1013 from the terminal 101. For example, the client 1013 obtains and stores the address when transmitting the peripheral address.

Step S805: The virtual USB device driver 1014 sends the URB to the USB bus driver 1015.

Step S806: The USB bus driver 1015 obtains the address in the URB, and sends the URB to the USB device 106.

Step S807: The USB device 106 obtains image data based on the URB, fills the image data in response message for the URB request, and sends the response message to the USB bus driver through the USB port.

A method for generating the URB response message by the USB device 106 is the same as that in step S605 in FIG. 6A. Details are not described herein again.

Step S808: The USB bus driver sends the response message to the virtual USB device driver.

Step S809: The virtual USB device driver transmits the response message to the USB client.

Step S810: The USB client extracts the image data from the response message, and splices the image data and image data extracted from other response message into one image.

Because header information in the URB response message includes an identifier of a frame to which the image data belongs and an identifier of the part that belongs to the frame, image data carried in a plurality of pieces of URB response message may be spliced into one image based on the identifiers.

In step S802, the USB client 1013 obtains resolution of the image, and therefore may prepare, in advance based on the resolution, a buffer for storing the image. In this way, after the image is obtained through splicing, the image may be stored in the buffer. In addition, it may be further determined, based on the resolution, whether an error occurs in the spliced image. If a size of the spliced image is greater than that of one image at the resolution, it may be determined that an error occurs.

Optionally, to save network bandwidth, the image is compressed before being transmitted. However, because some images are already in a compression format, step S811 needs to be performed to determine whether the image is in a compression format.

Step S811: The USB client determines, based on a format of the image data, whether the image data is in a compression format.

Because the client obtains the format of the image data in step S802, the client may determine, based on the format of the image data, whether the format of the image data is the compression format.

Step S812: If the image data is in the compression format, encapsulate the data of the spliced image into network data, that is, into data in the TCP protocol, and then transmit the encapsulated data to the virtual machine 104.

Step S813: If the image data is not in the compression format, compress the image data, set a compression format mark for the compressed data, and then perform step S814.

Step S814: After receiving the network data, the USB serving end of the virtual machine 104 extracts the image data from the network data, and determines, based on the specified data format, whether the image data is compressed by the USB client.

Step S815: If the image data is compressed by the USB client, decompress the compressed data, and perform step S816.

Only after the client includes a function of compressing the transmitted image, the virtual machine end 104 determines whether to decompress the received image. Therefore, steps S814 and S815 are optional.

Step S816: If the image data is not compressed by the USB client, directly segment the image into a plurality of pieces of data.

In steps S815 and S816, during data segmentation, segmentation is performed at intervals of a data length that is set by the URB.

The plurality of pieces of data obtained through the segmentation may be first buffered, and wait for the USB application program to obtain.

The following describes a method for obtaining image data after the USB application program is opened, which is shown in steps S817 to S822 in FIG. 8A.

Step S817: After the USB application program is opened, generate a data access request, and send the data access request to the USB device driver.

Step S818: The USB device driver 1046 generates a URB, and sends the URB to the virtual USB bus.

A manner of generating the URB by the USB device driver 1046 is the same as that in step S602. Details are not described herein again.

Step S819: The virtual USB bus driver sends the URB to the USB serving end 1048.

Step S820: The USB serving end 1048 obtains the buffered segmented image data, generates URB response message, and transmits the generated URB response message to the virtual USB bus driver 1045.

A method for generating the URB response message is the same as that in step S605 in FIG. 6A. Details are not described herein again.

Step S821: The virtual USB bus driver 1045 sends the URB response message to the USB device driver 1046.

Step S822: The USB device driver 1046 obtains the image data from the URB response message, splices the image data into one image, and then transmits the image to the USB application program for displaying.

In the embodiments provided in FIG. 7 and FIG. 8A and FIG. 8B, the terminal extracts the image data from the plurality of pieces of URB response message transmitted by the USB device, splices the image data into one image, and then sends the spliced image to the serving end. This reduces a data transmission delay compared with a manner of sending the image data in each URB to the server in the embodiments shown in FIG. 5 and FIG. 6A and FIG. 6B In addition, in the embodiments provided in FIG. 7 and FIG. 8A and FIG. 8B, the URB of the virtual machine does not need to be sent to the terminal, but the terminal generates the URB according to an instruction of the virtual machine. This can reduce a quantity of URBs transmitted on the network, and save network bandwidth compared with the solutions in the embodiments in FIG. 5 and FIG. 6A and FIG. 6B.

Further, in the embodiments provided in FIG. 7 and FIG. 8A and FIG. 8B, before the image is transmitted to the server, the image is further compressed, thereby further saving network bandwidth.

It should be noted that the modules in the foregoing embodiments may be implemented by using software, hardware, or a combination thereof. When any one of the foregoing modules or units is implemented by using software, the software exists in a form of a computer program instruction, and is stored in a memory. A processor may be configured to execute the program instruction to implement the foregoing method procedures. The processor may include but is not limited to at least one of the following computing devices that run various types of software: a central processing unit (CPU), a microprocessor, a digital signal processor (DSP), a microcontroller unit (MCU), an artificial intelligence processor, or the like. Each computing device may include one or more cores configured to perform an operation or processing by executing a software instruction. The processor may be embedded in an SoC (system-on-a-chip) or an application-specific integrated circuit (ASIC), or may be an independent semiconductor chip. In addition to the core configured to perform an operation or processing by executing a software instruction, the processor may further include a necessary hardware accelerator, for example, a field programmable gate array (FPGA), a PLD (programmable logic device), or a logic circuit that implements a dedicated logic operation.

When the foregoing modules or units are implemented by using hardware, the hardware may be any one or any combination of a CPU, a microprocessor, a DSP, an MCU, an artificial intelligence processor, an ASIC, an SoC, an FPGA, a PLD, a dedicated digital circuit, a hardware accelerator, or a non-integrated discrete device, and the hardware may run necessary software or does not depend on software, to perform the foregoing method procedures.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An image processing method performed by a server, comprising:
   obtaining, by executing first instructions, an image sent by a terminal over a network connection;
   splitting, by executing the first instructions, the image into a plurality of subimages;
   converting, by executing the first instructions, each subimage in the plurality of subimages into a USB request block (URB);
   splicing, by executing second instructions corresponding to a USB device driver, the URBs converted from the subimages back into the image; and obtaining, by executing third instructions corresponding to a USB application program, the image from the USB device driver.

2. The image processing method according to claim 1, further comprising:
generating, by executing the third instructions corresponding to the USB application program, a data access request;
sending, by executing the third instructions, the data access request to the USB device driver;
generating, by executing the second instructions corresponding to the USB device driver, a URB request based on the data access request;
converting, by executing the first instructions, the URB request to a network data request packet; and
sending, by executing the first instructions, the network data request packet to the terminal.

3. The image processing method according to claim 2, wherein the step of obtaining the image sent by the terminal receives the image sent by the terminal in response to the network data request packet.

4. The image processing method according to claim 2, further comprises:
receiving, by executing the first instructions, from the terminal an address of a camera connected to the terminal; and
sending, by executing the first instructions, the address to the USB device driver.

5. The image processing method according to claim 2, wherein the URB request comprises an address of a camera connected to the terminal.

6. The image processing method according to claim 5, wherein the image is captured by the camera connected to the terminal.

7. The image processing method according to claim 1, wherein the image is a frame of a video.

8. The image processing method according to claim 1, wherein the method is performed by a virtual machine running on the server.

9. The image processing method according to claim 1, further comprising:
displaying, by executing the third instructions, the image obtained from the USB device driver.

10. An image processing server, comprising:
a memory storing executable instructions;
a processor configured to execute first instructions of the executable instructions to:
obtain an image sent by a terminal over a network connection;
split the image into a plurality of subimages;
convert each subimage of the plurality of subimages into a URB;
the processor being further configured to executed second instructions of the executable instructions to splice all the URBs converted from the subimages back into the image, wherein the second instructions correspond to a USB device driver; and
the processor being further configured to executed third instructions of the executable instructions to obtain the image from the USB device driver, wherein the third instructions correspond to a USB application program.

11. The image processing server according to claim 10, wherein the processor is further configured to execute the third instructions to:
generate a data access request; and
send the data access request to the USB device driver;
the processor is further configured to execute the second instructions to:
generate the URB request based on the data access request; and
the processor is further configured to execute the first instructions to:
convert the URB request to a network data request packet; and
send the network data request packet to the terminal.

12. The image processing server according to claim 11, wherein the processor is configured to obtain the image sent by the terminal by receiving the image sent by the terminal in response to the network data request packet.

13. The image processing method according to claim 11, wherein the processor is further configured to execute the first executable instructions to receive, from the terminal, an address of a camera connected to the terminal.

14. The image processing server according to claim 11, wherein the URB request comprises an address of a camera connected to the terminal.

15. The image processing server according to claim 14, wherein the image is captured by the camera.

16. The image processing server according to claim 10, wherein the image is a frame of a video.

17. The image processing server according to claim 10, wherein the first instructions, the second instructions, and the third instructions are executed on a virtual machine running on the server.

18. The image processing server according to claim 10, wherein the processor is further configured to execute the third executable instructions to display the image obtained from the USB device driver.

* * * * *